No. 813,269. PATENTED FEB. 20, 1906.
P. H. WYNNE.
GALVANOMETER.
APPLICATION FILED JULY 14, 1905.
3 SHEETS—SHEET 1.
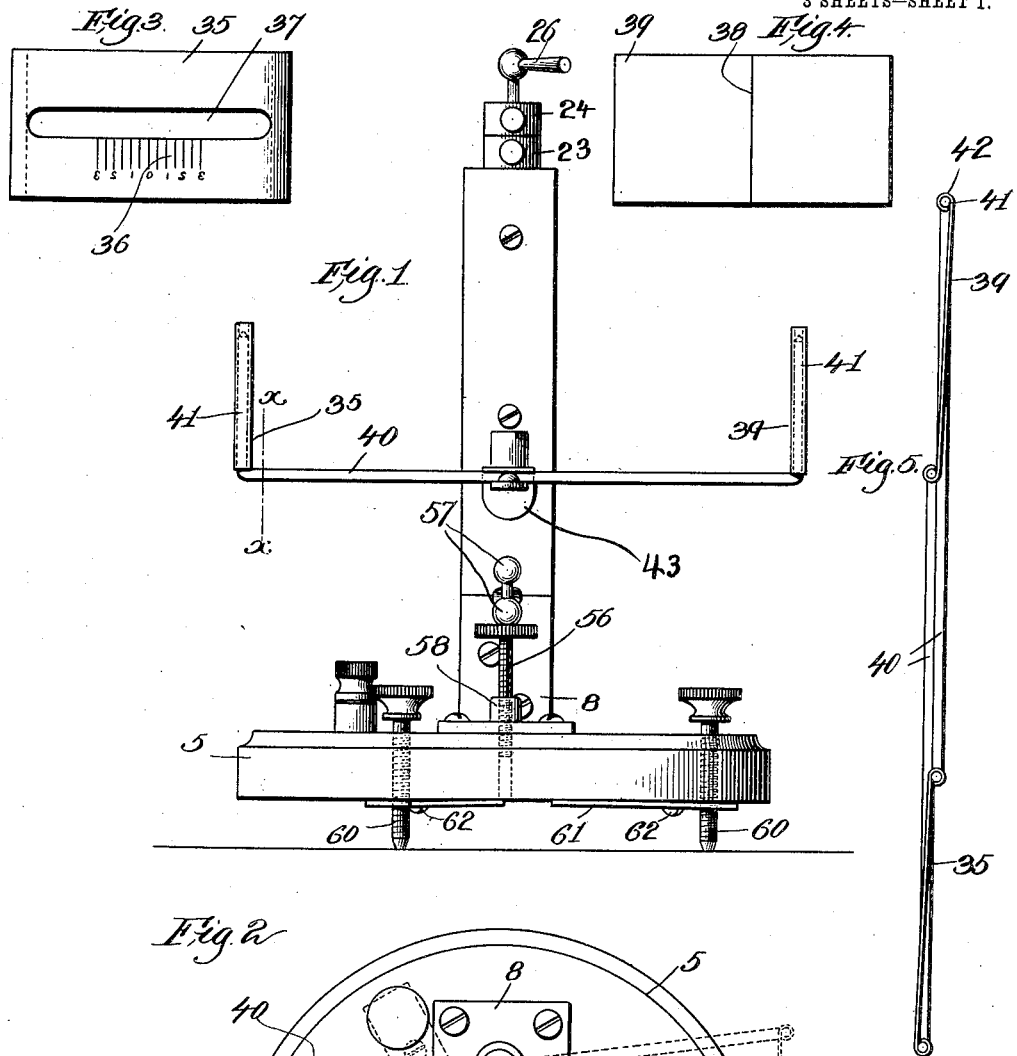
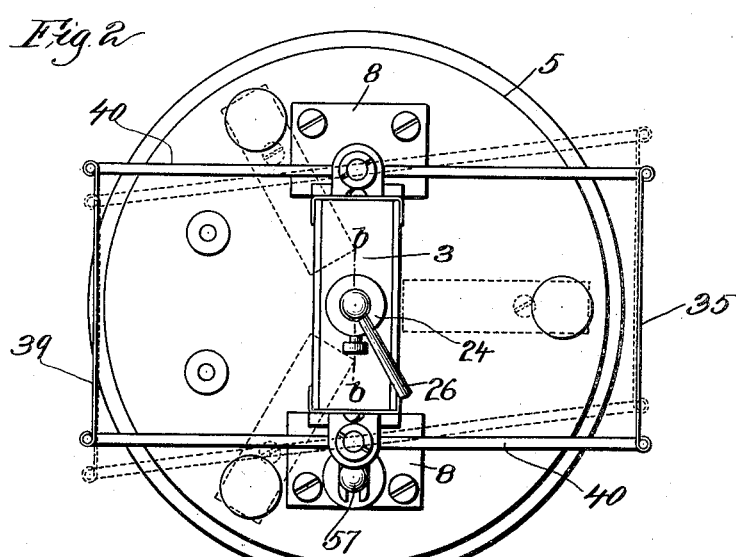
Witnesses.
W. C. Lunsford
S. W. Lutton
Inventor.
Philip H. Wynne,
by Crosby Gregory Attys No. 813,269.  
PATENTED FEB. 20, 1906.
P. H. WYNNE.  
GALVANOMETER.  
APPLICATION FILED JULY 14, 1905.
3 SHEETS—SHEET 2.
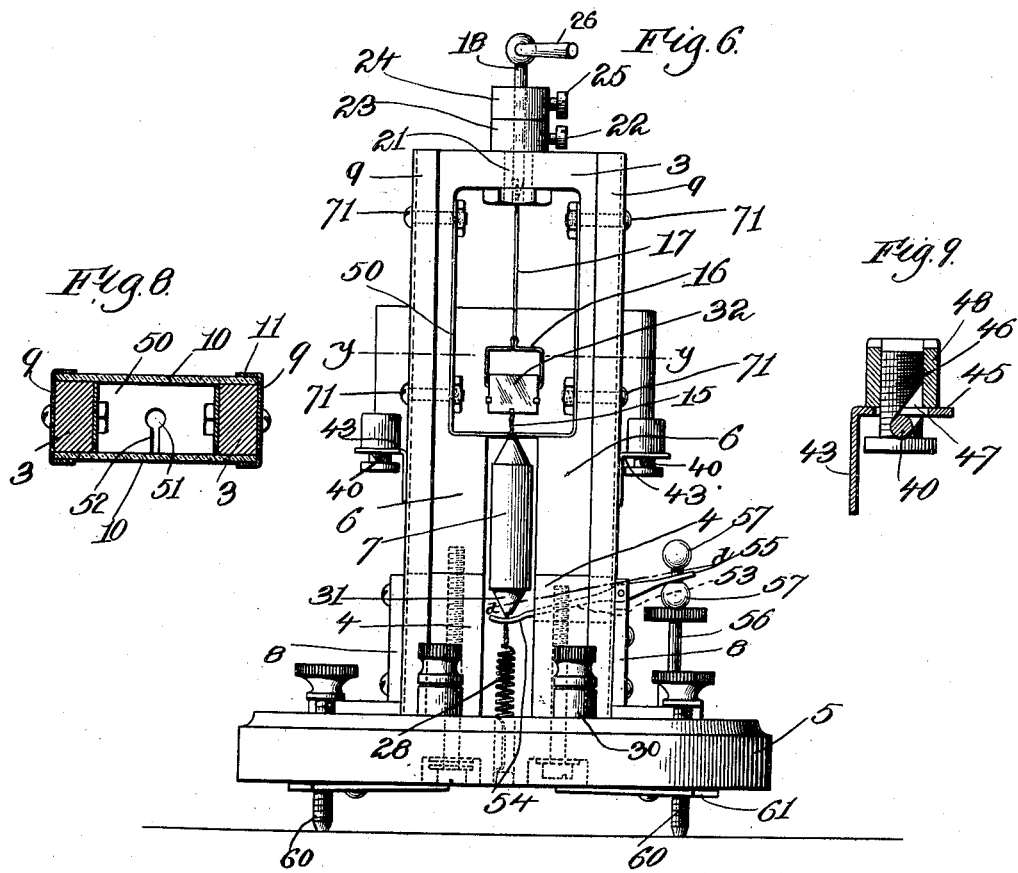
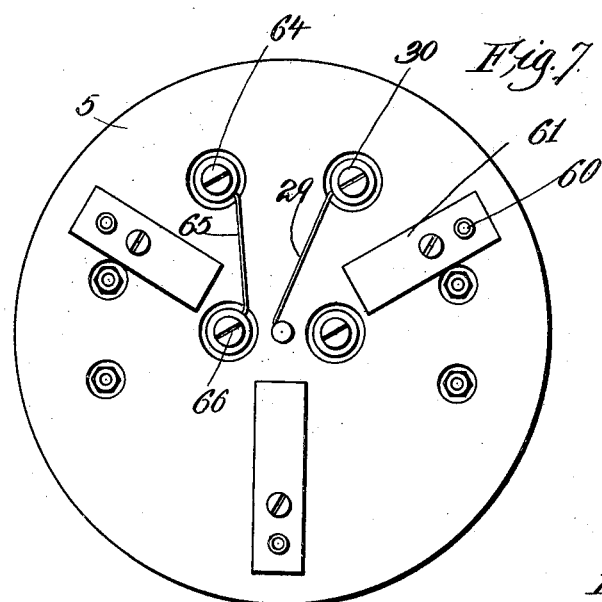
Witnesses:  
W. C. Lunsford  
S. W. Lutton
Inventor:  
Philip H. Wynne,  
by Cranby Gregg, atty's No. 813,269. PATENTED FEB. 20, 1906.
P. H. WYNNE.
GALVANOMETER.
APPLICATION FILED JULY 14, 1905.
3 SHEETS—SHEET 3.
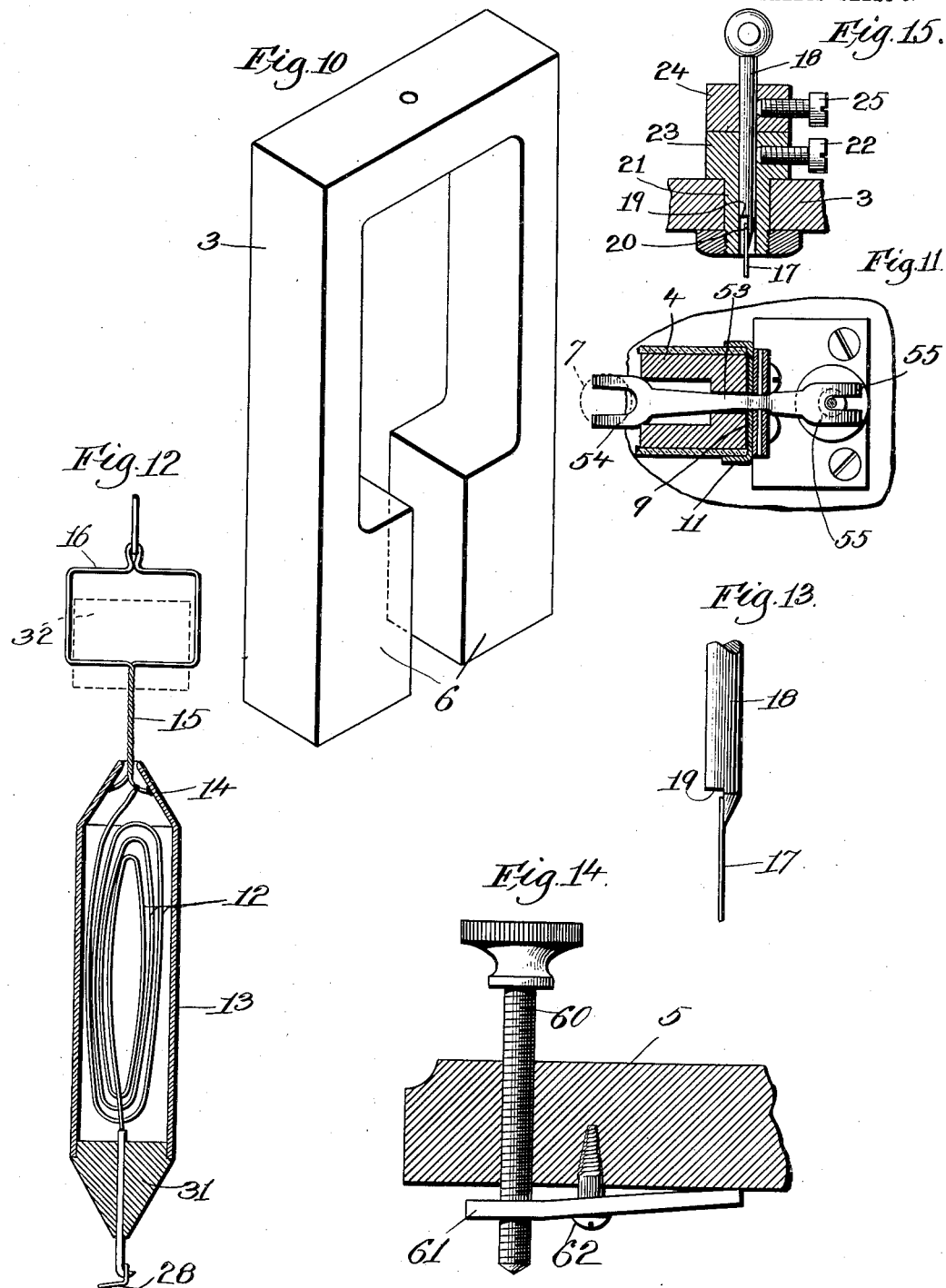
Witnesses.
W. C. Lunsford
S. W. Lutton
Inventor.
Philip H. Wynne,
by Crosby Gregory attys.

UNITED STATES PATENT OFFICE.

PHILIP HENRY WYNNE, OF BOSTON, MASSACHUSETTS, ASSIGNOR, BY DIRECT AND MESNE ASSIGNMENTS, OF ONE-HALF TO AGNES WYNNE AND ONE-HALF TO L. E. KNOTT APPARATUS COMPANY, OF BOSTON, MASSACHUSETTS, A CORPORATION OF MASSACHUSETTS.

GALVANOMETER.

No. 813,269.      Specification of Letters Patent.      Patented Feb. 20, 1906.

Application filed July 14, 1905. Serial No. 269,640.

*To all whom it may concern:*

Be it known that I, PHILIP HENRY WYNNE, a citizen of the United States, residing at Boston, in the county of Suffolk and State of Massachusetts, have invented an Improvement in Galvanometers, of which the following description, in connection with the accompanying drawings, is a specification, like numerals on the drawings representing like parts.

This invention relates to a galvanometer, and has for its object to provide an instrument of this type which is simple and inexpensive to manufacture and which is accurate in its operation.

The features wherein the invention resides will be more fully hereinafter described and then pointed out in the claims.

Figure 1 is a side view of my improved galvanometer. Fig. 2 is a top plan view. Fig. 3 is a view of the plate carrying the scale. Fig. 4 is a similar view of the plate carrying the fiducial mark. Fig. 5 is a view showing the frame carrying the scale and fiducial mark removed and folded. Fig. 6 is a section on the line $x$ $x$, Fig. 1, looking to the right. Fig. 7 is a bottom plan view of the base. Fig. 8 is a section on the line $y$ $y$, Fig. 6. Fig. 9 is a detail of the fastening device for the frame carrying the scale. Fig. 10 is a perspective view of the magnet. Fig. 11 is a section on line $d$ $d$, Fig. 6. Fig. 12 is a vertical section through the coil. Fig. 13 is a detail of the post to which the suspending-cord is secured. Fig. 14 is a detail of one of the leveling-screws; and Fig. 15 is a section on line $b$ $b$, Fig. 6.

The principal features of any galvanometer of the type known as "D'Arsonval" are a magnet, a coil supported in the field of the magnet, and some form of reading device by which the deflection of the coil can be determined. My present invention relates to galvanometers of this class, and has for its object to simplify their construction and to provide a galvanometer that is compact and portable.

3 designates a permanent magnet of the inverted horseshoe variety, which has the shape shown in Fig. 10. Said magnet is shown as supported on a distance-piece of non-magnetic material, which in turn is supported by a suitable base 5. Said distance-piece is herein shown as a pair of stilts or struts 4. The pole-pieces of the magnet 3 are designated by 6. They extend parallel to each other, and between them is supported the usual coil 7, the construction of which will be more fully described hereinafter. The magnet is held in its vertical position by means of supports 9, preferably of channel shape, which rise from the base 5 and are secured thereto by angle-shaped foot-pieces 8. The channel-shaped supports 9 embrace the edges of the magnet 3 and are secured thereto by bolts 71 and are confined at their lower ends between the angle-iron pieces 8 and the stilts 4. In order to protect the delicate parts of an instrument of this class—that is, the coil, its suspending devices, and the mirror, &c.—from disturbing factors, such as wind-currents, dust, &c., it is customary to inclose the magnet and the coils within a case having a glass window. In my present invention protection of the delicate parts is accomplished by placing two pieces of glass 10 on opposite sides of the magnet, so that said glass, the magnet, and the stilts 4 themselves form the inclosure within which the coil is suspended. The use of glass at the front and back of the magnet permits the observer in reading the instrument to see the fiducial mark and the scale reflection in the mirror, as will be presently described, and by supporting the glass front and back 10 by the magnet the device is made much more compact than galvanometers as commonly constructed. Moreover, with this construction the entire interior of the magnet is illuminated and the operation of the instrument is very easily observed. As herein shown, the glass is confined between the inturned edges 11 of the supports 9 and the magnet, and said glass may be readily removed by sliding it upwardly in the runway formed by said inturned edges 11. By means of this simple construction the working parts of the instrument are made readily accessible and yet are perfectly protected and thoroughly illuminated.

The coil 7 is of special construction, as shown in Fig. 12. 12 designates the coil proper, which, it will be seen, is inclosed in a casing 13 of some suitable material, such as opper. The upper end 14 of this casing is preferably cone-shaped and has secured thereto the supporting-wires 15, which are twisted together at their lower ends and are opened at their upper ends to form the suspending-loop 16. Secured to said loop 16 is the metallic suspension-ribbon 17, which is fastened at its upper end to a suspension-rod 18, which extends through the top of the magnet 3. The lower end of said suspension-rod is cut away, as at 19, (see Fig. 13,) to form a surface 20 substantially in the axial line of said suspension-rod, and to this surface the suspension-ribbon 17 is secured. This construction is employed, so that the suspension-ribbon 17 may occupy the axial line of the suspension-rod 18. The suspension-rod 18 extends through a sleeve 21 in the upper end of the magnet 3 and is held from turning and also from vertical movement by a clamping-screw 22, operating in a collar 23, fast with said sleeve. Above the collar 23 is another collar 24, through which the suspension-rod 18 passes, said collar carrying a clamping-screw 25. When the clamping-screw 22 is loosened and the clamping-screw 25 is tightened, the suspension-rod may be freely turned by means of a suitable handle 26, said rod being held from downward movement by the collar 23.

One end of the coil 12 may be fastened either directly to the supporting-wires 15 or to the metallic shell 13, and the wire from the other end is taken through a block 31 of non-conducting material and is connected, by means of a non-directive spiral 28 of fine metallic ribbon and a wire 29, with the binder-post 30 in the base 5. The shell 13 surrounding the coil is very effective in clamping the vibrations of the coil when the instrument is in use. The block 31 may be of wood or any other suitable non-conducting material. It is preferably conical in shape and forms the lower conical end or head of the shell 13.

32 designates a mirror which is secured to the loop 16 in any suitable way, said mirror being so placed that the loop projects above the mirror, thus leaving an open space directly above the mirror, through which the fiducial mark can be observed.

The construction of the scale and fiducial mark by which the movement of the coil is noted and the manner of reading it are substantially the same as in the apparatus shown in my Patent No. 763,829, dated June 28, 1904.

35 designates a plate or card bearing a properly-graduated scale 36. In practice I prefer to make said plate or card with the sight-opening 37, directly beneath which the graduations are placed. The fiducial mark 38 is carried by another card or plate 39. The plates 35 and 39 are located on opposite sides of the galvanometer, as seen in Fig. 1, the side of the plate 35 carrying the scale and the side of the plate 39 carrying the mark 38, both being faced toward the galvanometer. The reflecting-surface of the mirror 16 faces the scale 36 and is midway between the scale and fiducial mark, and when the parts are properly adjusted the observer looks through the sight-opening 37 and sees in the mirror the reflection of the scale 36 and also sees the fiducial mark 38.

The instrument is read by noting the relative movement of the scale and fiducial mark. For a fuller description of the method of using the instrument reference is had to the above-named patent.

In my present invention I support the plates 35 and 39 in a novel way so that they can be easily adjusted into operative position. Extending along each side of the instrument is a supporting rod or bar 40, which has upturned ends 41. The plates 35 and 39 are supported on said upturned ends 41 in any suitable way, preferably by making the edges of each plate with the sockets 42, in which the upturned ends 41 of the arms are loosely fitted. The rods 40 are detachably supported in suitable brackets 43 in such a way that they can be adjusted longitudinally and also turned about a vertical axis. As herein shown, each bracket 43 is provided with the horizontal portion 45, having an aperture through which extends a clamping member 46. Each clamping member is provided with the inclined slot 47, in which one of the rods 40 is received, and the upper end of said clamping member is screw-threaded into a clamping-nut 48. When the clamping-nuts 48 are tightened, the rods 40 are drawn tightly against the brackets, and thus clamped in their adjusted position. When the clamping-nuts are loosened, the rods 40 may be adjusted longitudinally to bring both the scale and the fiducial mark the proper distance from the mirror and also may be turned laterally, as shown in dotted lines, Fig. 2. It will be observed that during the lateral swinging movement of the rods 40 they have what is commonly known as the "parallel-ruler motion," and therefore so long as these rods have only a lateral turning movement the plates 39 and 35 will be maintained in parallelism.

In adjusting the instrument preparatory to making a test with it it is desirable that the mirror, fiducial mark, and scale be so adjusted with relation to each other that to the observer, looking through the sight-opening 37, the reflection in the mirror of the zero-mark on the scale will be in alinement with the fiducial mark 38. In most galvanometers this adjusting must be done by turning the coil and the mirror, an operation which must be performed very delicately and with great care. With my improved parallel-ruler construction the operator can properly adjust the instrument by simply swinging the rods 40 laterally, as shown in dotted lines, Fig. 2, until the fiducial mark and reflection of the scale in the mirror have the proper relation to each other. This adjustment, of course, can also be made in the other manner, if desired, by turning the suspension-rod 18, and thereby turning the mirror; but the simpler and easier way is to make the adjustment by swinging the rods 40. Fig. 5 illustrates how the rods 40 and the plates 39 and 35 can be folded together when the instrument is packed for transportation.

When the instrument is not in use or when it is being transported, it is essential that the weight of the coil 7 be taken from the extremely delicate suspension-ribbon 17 and that said coil be tightly clamped to prevent its having any movement. I have provided for this as follows: 50 designates a U-shaped plate of sheet material which is placed between the legs of the magnet and rests on the pole-pieces 6 thereof, said plate being held in position by the bolts 71. The horizontal portion of said plate has the aperture 51 therethrough, through which the supporting-wires 15 pass freely, said aperture having a slot 52 leading thereto to permit the parts to be assembled. 53 designates a clamping-lever which is pivoted either to one of the stilts 4 or to one of the angle-pieces 8. Both ends of said lever are forked, the forked end 54 straddling the wire leading from the coil and being constructed to engage the head 31 and the other forked end 55 straddling the clamping-screw 56, which is provided with two enlargements or collars 57 either side of the clamping-lever. The clamping-nut 56 works in a fixed nut 58, which may be integral with one of the angle-pieces 8 or separate therefrom. When the instrument is not in use or is to be transported, the clamping-screw 56 is turned down, thereby bringing the upper enlargement 57 against the clamping-lever and throwing the inner end of the clamping-lever upwardly against the head 31. This operation lifts the entire coil and clamps the conical heads thereof between the horizontal portion of the plate 50 and the clamping-lever, thus relieving the suspension-ribbon of all strain. A movement of the screw in the opposite direction will obviously release the coil and allow it to hang free. Preferably the lever 53 will be so mounted that there will be sufficient friction at the fulcrum-point to hold said lever in any adjusted position. I use this construction because the suspension-ribbon 17 is necessarily very delicate, and where the lever is thus maintained in any adjusted position by friction it will only be moved for releasing or clamping the coil by the positive action of the clamping-screw 56.

60 designates leveling-screws by which the base or table 5 may be leveled. It is essential that these screws work through the base without any backlash or side shake, and in order to provide a simple and inexpensive way of taking up any lost motion I screw said screws directly through the wood of the base 5 and then through friction-strips 61, which are separated slightly from the base 5, as seen best in Figs. 1 and 6 and 14. A screw 62 passes through each friction member 61 and into the base 5, and by tightening each screw 62 more or less all lost motion in the corresponding leveling-screw 60 may be entirely taken up and said screw made to operate smoothly and evenly and with any desired degree of friction.

The current is taken into the instrument through a binding-post 64, which is connected by a wire 65 with another binding-post 66, the screw of the latter being connected either to the magnet or to one of the angle-pieces 8. The current therefore passes to binding-post 66 and to the magnet and from the latter to the suspension-rod and suspension-ribbon 17 and to the coil 12 and from the latter to the binding-post 30, as above described.

It will be understood that various changes in the construction and arrangement of the parts may be made without departing from the invention.

Having fully described my invention, what I claim as new, and desire to secure by Letters Patent, is—

1. In a galvanometer, an inverted horseshoe-magnet, stilts or struts of non-magnetic material on which said magnet is supported, and a coil suspended between the poles of the magnet to swing about a vertical axis.

2. In a galvanometer, a base or table, stilts of non-magnetic material rising therefrom, a horseshoe-magnet with parallel pole-pieces resting on said stilts, and a vertical coil suspended between said parallel pole-pieces.

3. In a galvanometer, a base, stilts of non-magnetic material rising therefrom, a horseshoe-magnet resting on said stilts, a coil suspended between the poles of said magnet, and transparent plates resting against the magnet and forming with the magnet an inclosing case for the coil.

4. In a galvanometer, a base, non-magnetic stilts rising therefrom, a horseshoe-magnet arranged with its pole-pieces resting on said stilts, a coil suspended between said pole-pieces, and supports secured to the base and the sides of the magnet for holding the magnet in position.

5. In a galvanometer, a base, non-magnetic stilts rising therefrom, a horseshoe-magnet arranged with its pole-pieces resting on said stilts, a coil suspended between said pole-pieces, and channel-shaped supports rigid with the base and embracing the sides of the magnet and holding the latter in position.

6. In a galvanometer, a base, non-magnetic stilts rising therefrom, a horseshoe-magnet arranged with its pole-pieces resting on said stilts, a coil suspended between said pole-pieces, channel-shaped supports rigid with the base and embracing the sides of the magnet and holding the latter in position, and transparent plates overlying the magnet and clamped thereto by the channel-shaped supports.

7. In a galvanometer, a base, channel-shaped supports rising from the base, an inverted horseshoe-magnet between said supports and sustained thereby, and a suspended coil in the field of the magnet.

8. In a galvanometer, a base, supports rising therefrom, an inverted horseshoe-magnet between said supports and sustained thereby, a non-magnetic distance-piece between the magnet and base, and a coil suspended in the field of the magnet.

9. In a galvanometer, a base, channel-shaped supports rising therefrom, an inverted horseshoe-magnet between said supports and sustained thereby, and transparent plates overlying the magnet and clamped thereto by the channel-shaped supports.

10. In a galvanometer, a base, supports rising therefrom, a magnet held in position by said supports, a suspended coil between the pole-pieces of the magnet, brackets secured to said supports, and a reading device adjustably mounted on said brackets.

11. In a galvanometer, a base, supports rising therefrom, a magnet held in position between said supports, a suspended coil between the pole-pieces of the magnet, brackets sustained by the supports, and a reading device adjustably mounted on the brackets for movement transversely of the magnet.

12. In a galvanometer, a base, supports rising therefrom, a magnet between said supports and held in position thereby, a coil suspended between the pole-pieces of the magnet, brackets extending from the supports, a supporting-rod adjustably clamped to each bracket, and plates carrying a scale and a fiducial mark respectively, sustained by said supporting-rods.

13. In a galvanometer, a base, supports rising therefrom, a magnet sustained between said supports, a coil suspended in the field of the magnet, brackets carried by the supports, rods adjustably clamped to the bracket and capable of a lateral swinging and a longitudinal movement, and plates carrying a scale and a fiducial mark respectively, sustained by said rods.

14. In a galvanometer, a base, supports rising therefrom, a magnet sustained by said supports, a coil suspended in the field of the magnet, brackets carried by the supports, a slotted clamping-screw carried by each bracket, a rod passing through the slot of each clamping-screw, and plates carrying a scale and fiducial mark respectively sustained by said rods.

15. In a galvanometer, a pair of supports, a magnet sustained thereby, a bracket carried by each support, a horizontal rod adjustably clamped to each bracket, and plates carrying a scale and fiducial mark respectively, pivotally connected to the rods at their ends.

16. In a galvanometer, a base, supports rising therefrom, a magnet arranged between and sustained by said supports, a coil suspended between the poles of the magnet, and a clamping-lever pivoted to one of the supports and adapted to engage the coil to clamp it in inoperative position.

17. In a galvanometer, a base, supports rising therefrom, an inverted magnet between said supports and sustained thereby, a coil suspended between the pole-pieces of the magnet, a protecting-shell inclosing the coil, and means to immovably clamp said shell in inoperative position.

18. In a galvanometer, a base, a magnet supported thereby, a coil operated by the magnet, leveling-screws screw-threaded through the base, and friction members separate from the base and through which the leveling-screws pass, said friction members being adjustable with relation to the base, thereby to take up lost motion.

In testimony whereof I have signed my name to this specification in the presence of two subscribing witnesses.

PHILIP HENRY WYNNE.

Witnesses:
 LOUIS C. SMITH,
 BERTHA F. HEUSER.